(12) United States Patent
Miyajima

(10) Patent No.: US 11,252,330 B2
(45) Date of Patent: Feb. 15, 2022

(54) DISPLAY CONTROL APPARATUS AND CONTROL METHOD THEREFOR

(71) Applicant: CANON KABUSHIKI KAISHA, Tokyo (JP)

(72) Inventor: Takuro Miyajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/819,662

(22) Filed: Mar. 16, 2020

(65) Prior Publication Data
US 2020/0221035 A1 Jul. 9, 2020

Related U.S. Application Data

(63) Continuation of application No. PCT/JP2018/035407, filed on Sep. 25, 2018.

(30) Foreign Application Priority Data

Oct. 10, 2017 (JP) .............................. JP2017-197252

(51) Int. Cl.
*H04N 5/232* (2006.01)
*G03B 13/02* (2021.01)

(52) U.S. Cl.
CPC ....... *H04N 5/232411* (2018.08); *G03B 13/02* (2013.01); *H04N 5/23245* (2013.01); *H04N 5/23293* (2013.01); *H04N 5/232939* (2018.08)

(58) Field of Classification Search
CPC ......... H04N 5/23241; H04N 5/232411; H04N 5/23245; H04N 5/23293; H04N 5/232939
See application file for complete search history.

(56) References Cited

U.S. PATENT DOCUMENTS

2016/0073030 A1* 3/2016 Park ................... H04N 5/23293 348/207.11
2016/0344927 A1* 11/2016 Brasket .............. H04N 5/23232

FOREIGN PATENT DOCUMENTS

| JP | 2007-199199 A | 8/2007 |
|----|---------------|--------|
| JP | 2009-111458 A | 5/2009 |
| JP | 2015-233250 A | 12/2015 |
| JP | 2016-127498 A | 7/2016 |
| JP | 2017-22560 A | 1/2017 |
| JP | 2017-183983 A | 10/2017 |
| WO | 2012/001749 A1 | 1/2012 |

* cited by examiner

*Primary Examiner* — Daniel M Pasiewicz
(74) *Attorney, Agent, or Firm* — Canon U.S.A., Inc. I.P. Division

(57) ABSTRACT

A display control apparatus includes detection means (a proximity sensor 75) configured to detect that an object has approached, and control means (a system control unit 50) configured to perform control such that in response to the detection means detecting that the object has approached, a display of a first display unit (a monitor 28) is turned off. In a case where interval shooting or long exposure shooting is performed, the control means performs control such that in response to the detection means detecting that the object has approached (S411), the display of the first display unit is turned on (S413).

20 Claims, 10 Drawing Sheets

DISPLAY CONTROL APPARATUS AND CONTROL METHOD THEREFOR

CROSS-REFERENCE TO RELATED APPLICATIONS

This application is a Continuation of International Patent Application No. PCT/JP2018/035407, filed Sep. 25, 2018, which claims the benefit of Japanese Patent Application No. 2017-197252, filed Oct. 10, 2017, both of which are hereby incorporated by reference herein in their entirety.

TECHNICAL FIELD

The present invention relates to a display control apparatus capable of controlling displaying in response to a detection by a proximity sensor, and a control method therefor.

BACKGROUND ART

In a known method, in response to detecting an object coming into proximity by a proximity sensor, a displaying state of a display unit such as a viewfinder of a digital camera is switched between a display ON state in which an image is displayed and a display OFF state in which no image is displayed. PTL 1 discloses a technique in which in a case where an object in proximity is detected when a user is looking into a viewing part in a viewfinder, a live view image (a LV image) is displayed on a display unit in the viewfinder. When a display switch button is pressed, the LV image is displayed on a back-side liquid crystal display. In another known technique, blurring in a captured image is reduced even if a camera moves during shooting. PTL 2 discloses a technique in which when it is determined that a camera has moved in shooting of a star trail, an image captured when the camera was moving is not included in synthesis of the trail.

In the technique disclosed in PTL 1, when a user wants to display an image on the back-side liquid crystal display in shooting such as interval shooting or long exposure shooting, the user has to press the button. When the button is pressed, the camera may move which may cause an image of an object to be blurred or may cause the shooting position to shift. In the technique disclosed in PTL 2, when it is determined that the camera has moved, the captured image is not used in synthesizing the trail, which may cause the trail to be interrupted on the way, and thus an image desired by the user may not be obtained.

CITATION LIST

Patent Literature

PTL 1: Japanese Patent Laid-Open No. 2016-127498
PTL 2: Japanese Patent Laid-Open No. 2015-233250

In view of the above, an object of the present invention is to provide a display control apparatus capable of performing displaying on a display unit such that an effect on a shooting result is reduced.

SUMMARY OF INVENTION

To achieve the above object, the present invention provides a display control apparatus including detection means configured to detect of an object coming into proximity, accepting means capable of accepting an instruction to perform interval shooting in which a series of images is to be captured in response to a single shooting instruction, and control means configured to perform control such that in a predetermined mode other than a mode in which the interval shooting is performed, a first display unit is not turned on into a display ON state in which an image is displayed even when the detection means detects an object which has come into proximity, while in an interval period of the interval shooting, the first display unit is turned on into a display ON state in which an image is displayed in response to detecting by the detection means that an object has come into proximity.

Further features of the present invention will become apparent from the following description of exemplary embodiments with reference to the attached drawings.

DESCRIPTION OF EMBODIMENTS

Preferred embodiments of the present invention are described below with reference to the drawings.

In the embodiments described below, an explanation is given for an example case where interval shooting is performed. Interval shooting is a method in which shooting is performed a plurality of times in response to a single shooting instruction such that still images are captured at regular intervals, and a single still image is generated by synthesizing a plurality of captured images or a moving image is generated from a plurality of captured images. To generate a moving image, a plurality of moving images may be captured at regular intervals. In interval shooting, if a composition shifts, a blur may occur in captured still or moving image. For example, the trail of the star may be shifted on the way when the starry sky is shot. In a case where a moving image is captured, the star may suddenly move significantly at a certain point of the moving image. Therefore, in general, to obtain a result desired by a user in the interval shooting, fixed point shooting is employed from the start to the end of the shooting.

First Embodiment

Figure 1:
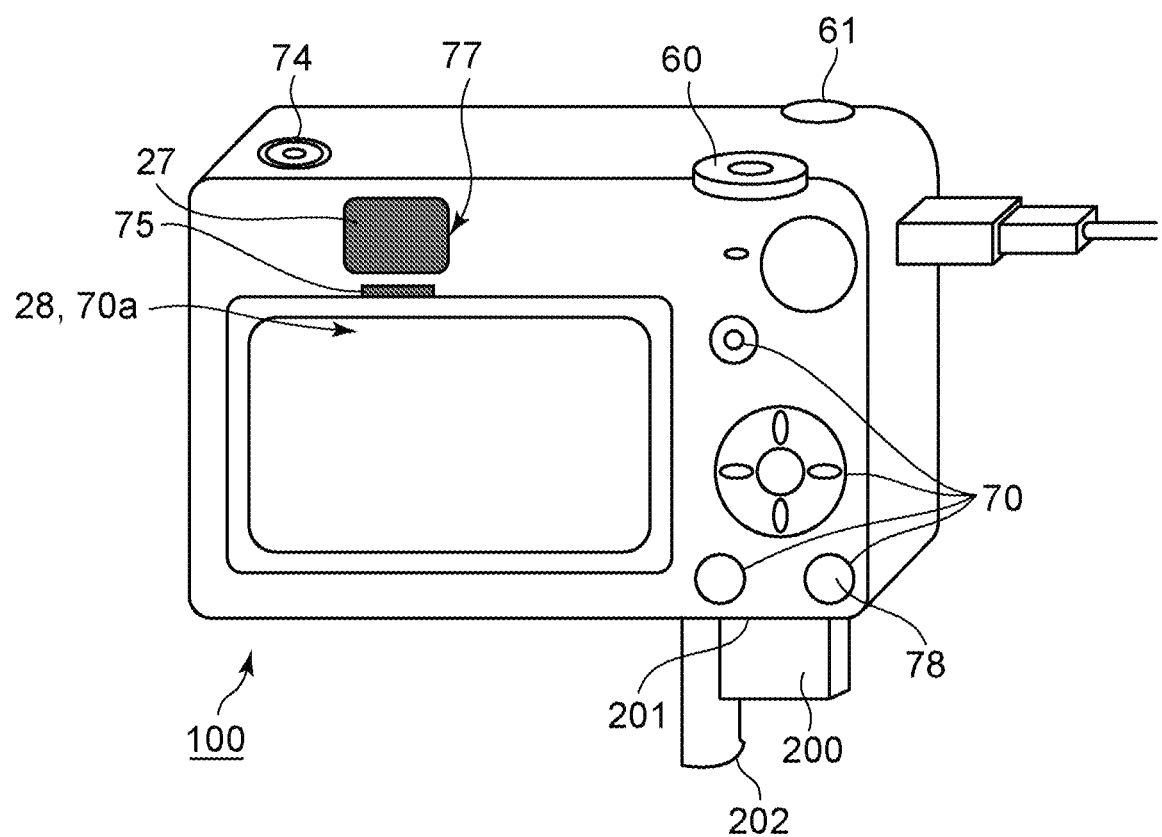
FIG. 1 is an external view of a digital camera as an example of a display control apparatus according to a first embodiment.
Figure 2:
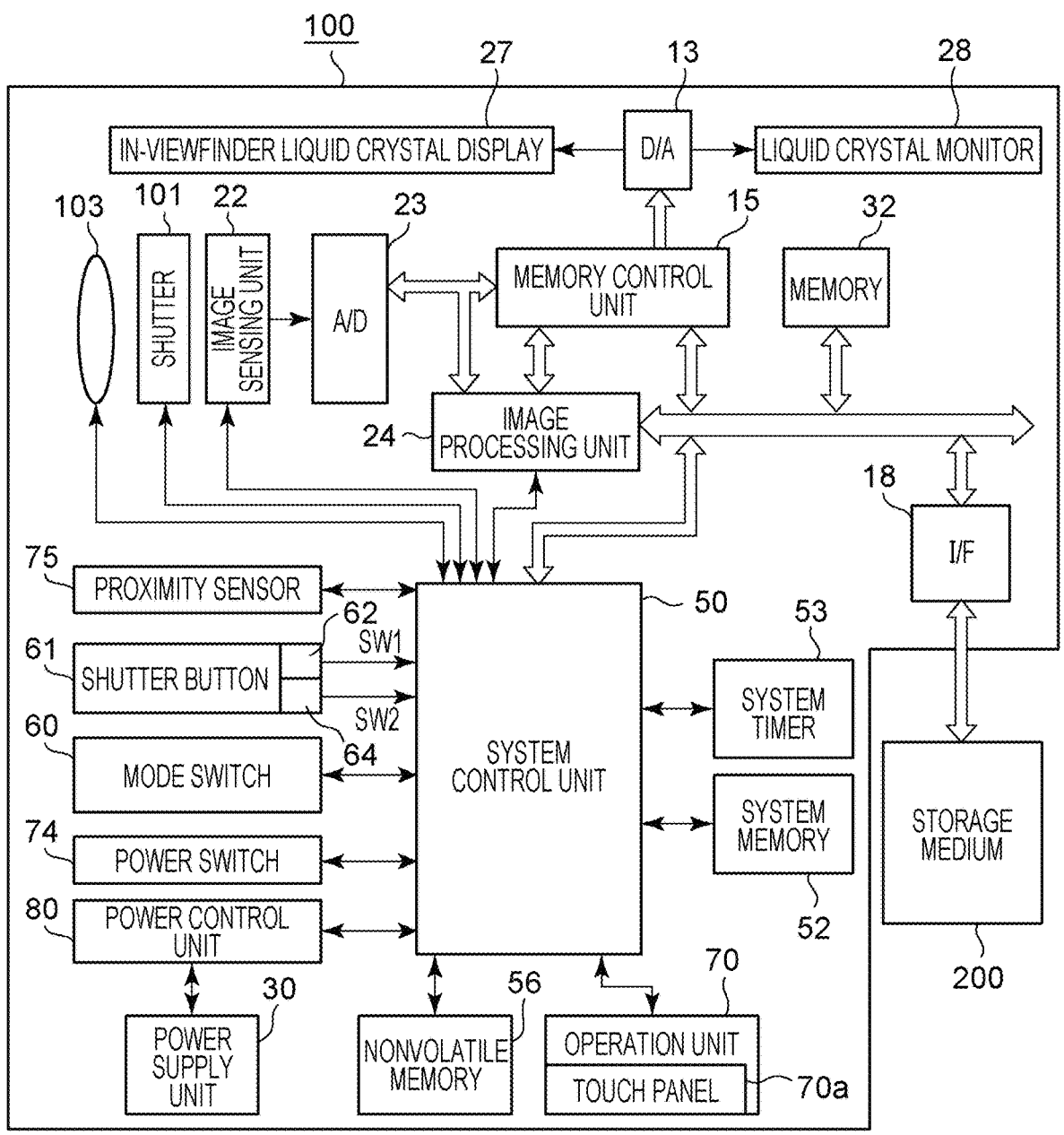
FIG. 2 is a block diagram illustrating a digital camera as an example of a display control apparatus configured according to the first embodiment.

FIG. 1 is an external view illustrating a digital camera 100 which is an example of a display control apparatus according to the present invention. FIG. 2 is a block diagram illustrating an example of a configuration of a digital camera 100 which is an example of a display control apparatus according to the present invention.

In FIG. 1, a liquid crystal monitor 28 is a display unit that displays images and various types of information. An in-viewfinder liquid crystal display 27 is a display unit provided in a viewfinder for displaying images and various kinds of information similar to those displayed by the liquid crystal monitor 28. A touch panel 70a is provided integrally with the liquid crystal monitor 28. The touch panel 70a can detect a touch operation performed on a display surface of the liquid crystal monitor 28, which allows a user to perform an intuitive touch operation on an item or an object displayed on the liquid crystal monitor 28.

A shutter button 61 is an operation unit for issuing a shooting instruction. A mode switch 60 is an operation unit for switching various modes. An operation unit 70 includes operation parts such as various switches, buttons, and a touch panel, and/or the like for receiving various operations from a user. A power switch 74 is a push button for switching between power-on and power-off states.

The above-mentioned in-viewfinder liquid crystal display 27 becomes visible when a user looks into the viewfinder 77. When the user tries to look into the viewfinder 77, a proximity sensor 75, which is disposed below the viewfinder 77 and which is configured to detect an object coming into proximity of the proximity sensor 75, detects that the user comes into proximity and, in response, the in-viewfinder liquid crystal display 27 is activated to display an image thereon. The proximity sensor 75 is a detection unit configured to detect an object when the object comes into proximity. More specifically, proximity sensor 75 detects a change in capacitance between an object and the sensor, and determines whether or not the object has come into proximity based on whether or not the amount of change in capacitance is greater than a threshold value. The method of detecting an object coming into proximity by the proximity sensor 75 is not limited to that using the capacitance. For example, in another applicable method, infrared light is emitted and a determination is made as to whether or not an object is in proximity based on power of reflected infrared light.

A display switch button 78 is a button for switching the display on which an image is displayed between the in-viewfinder liquid crystal display 27 and the liquid crystal monitor 28.

A recording medium 200 is a recording medium such as a memory card, a hard disk, and/or the like. A recording medium slot 201 is a slot for installing the recording medium 200. The recording medium 200 installed in the recording medium slot 201 is capable of communicating with the digital camera 100, which makes it possible to perform recoding or playback operation. A lid 202 is a lid of the recording medium slot 201. FIG. 1 shows a state in which the lid 202 is opened and the recording medium 200 is partially taken out from the slot 201 and exposed.

FIG. 2 is a block diagram illustrating an example of a configuration of the digital camera 100 according to the present embodiment. In FIG. 2, an imaging lens 103 is a lens group including a zoom lens and a focus lens. A shutter 101 is a shutter having an aperture function. An image sensing unit 22 is an image sensor device configured using a CCD or a CMOS device that converts an optical image into an electric signal. An A/D converter 23 converts an analog signal into a digital signal. The A/D converter 23 is used to convert an analog signal output from image sensing unit 22 into a digital signal.

An image processing unit 24 performs predetermined processing on data output from the A/D converter 23 or data output from a memory control unit 15. The processing performed by the image processing unit 24 may include pixel interpolation, resizing such as reduction, and color conversion. The image processing unit 24 performs a predetermined calculation process using captured image data, and, based on the result of the calculation process, the system control unit 50 controls exposure and distance measurement. This makes it possible to perform AF (auto focus) processing of a TTL (through the lens) method, AE (auto exposure) processing, and EF (pre-flashing) processing. Furthermore, the image processing unit 24 performs a predetermined calculation process using the captured image data and performs TTL AWB (auto white balance) processing based on the obtained result of the calculation process.

Output data from the A/D converter 23 is stored in a memory 32 via the image processing unit 24 and the memory control unit 15 and directly stored via the memory control unit 15. The memory 32 stores image data obtained by the image sensing unit 22 and converted to digital data by the A/D converter 23, and image data to be displayed on the liquid crystal monitor 28 or the in-viewfinder liquid crystal display 27. The memory 32 has a sufficient storage capacity for storing a predetermined number of still images or a moving image and audio data with a length of a predetermined time.

The memory 32 also serves as an image display memory (a video memory). The D/A converter 13 converts image display data stored in the memory 32 into an analog signal and supplies the resultant analog signal to the liquid crystal monitor 28 or the in-viewfinder liquid crystal display 27. The image display data stored in the memory 32 is displayed on the liquid crystal monitor 28 or the in-viewfinder liquid crystal display 27 via the D/A converter 13. The liquid crystal monitor 28 displays an image on a display device such as an LCD according to the analog signal supplied from the D/A converter 13. The digital signal once A/D converted by the A/D converter 23 and stored in the memory 32 is converted to an analog signal by the D/A converter 13 and is sequentially transferred to the liquid crystal monitor 28 to display a through image (a live view image). The in-viewfinder liquid crystal display 27 functions as an electronic viewfinder by performing processing similar to that performed by the liquid crystal monitor 28. Note that the in-viewfinder liquid crystal display 27 is not limited to the electronic viewfinder, but an optical viewfinder may be used. In a case where an optical viewfinder is used, a display surface is formed near a focusing screen on a viewfinder optical path such that it is possible to simultaneously view an optical image of an object formed on the focusing screen and an image displayed on the in-viewfinder liquid crystal display.

A nonvolatile memory 56 is a memory serving as an electrically erasable/recordable recording medium. For example, an EEPROM or the like is used as the nonvolatile memory 56. The nonvolatile memory 56 stores a constant, a program, and/or the like for use in the operation of the system control unit 50. Note that the program refers to a computer program for executing various flow charts described later according to the present embodiment.

A RAM is used as the system memory 52. In the system memory 52, a constant and a variable for use in the operation by the system control unit 50, a program read out from the nonvolatile memory 56, and/or the like are loaded. The system control unit 50 also controls displaying by controlling the memory 32, the D/A converter 13, the liquid crystal monitor 28, and/or the like.

A system timer 53 is a time measuring unit that measures the time used in various controls and the time of a built-in clock.

The mode switch 60, the shutter button 61, and the operation unit 70 each function as operation means for inputting various operation instructions to the system control unit 50. The mode switch 60 switches the operation mode of the system control unit 50 to one of a still image recording mode, a moving image shooting mode, an interval shooting mode, a playback mode, a menu screen, and/or the like.

When the shutter button 61 provided on the digital camera 100 is half-pressed (a shooting preparation instruction), a first shutter switch 62 is turned on and a first shutter switch signal SW1 is generated. The first shutter switch signal SW1 causes it to start operations such as AF (auto focus) processing, AE (auto exposure) processing, AWB (auto white balance) processing, and EF (pre-flashing) processing, and/or the like.

When the operation of the shutter button 61 is fully completed, that is, when the shutter button 61 is fully pressed (thereby issuing a shooting instruction), the second shutter switch 64 is turned on, and a second shutter switch signal SW2 is generated. In response to the second shutter switch signal SW2, the system control unit 50 starts a series of shooting processing operations from an operation of reading a signal from the image sensing unit 22 to an operation of storing image data in the recording medium 200.

By selecting and operating various function icons displayed on the liquid crystal monitor 28, the in-viewfinder liquid crystal display 27, and/or the like, and functions as various function buttons, operation parts in the operation unit 70 are appropriately assigned corresponding function depending on a scene such that they serves as function buttons. The function buttons include, for example, an end button, a return button, an image forward button, a jump button, a refinement button, an attribute change button, and/or the like. For example, when a menu button is pressed, a menu screen on which various settings can be made is displayed on the liquid crystal monitor 28 or the like. A user is allowed to intuitively perform various settings using the menu screen displayed on the liquid crystal monitor 28 or the like, the four-way buttons of up, down, left and right buttons, and the SET button.

A power control unit 80 includes a battery detection circuit, a DC-DC converter, a switch circuit for switching a block to which power is to be supplied, and the like, and performs control related to detecting whether or not a battery is mounted, the type of the battery, and the remaining battery level. Based on the result of the detection and an instruction issued by the system control unit 50, the power control unit 80 controls the DC-DC converter so as to supply a necessary voltage to each unit including the recording medium 200 for a necessary period.

A power supply unit 30 includes a primary battery such as an alkaline battery, a lithium battery, a secondary battery such as a NiCd battery, a NiMH battery, a Li battery, and an AC adapter, and/or the like. A recording medium I/F 18 is an interface with a recording medium 200 such as a memory card or a hard disk. The recording medium 200 is a recording medium such as a memory card for recording a captured image. The recording medium 200 may be, for example, a semiconductor memory, an optical disk, a magnetic disk, or the like.

The proximity sensor 75 is a sensor for detecting whether an object has come into proximity of the viewfinder 77 of the digital camera 100. When no object is detected in proximity, the liquid crystal monitor 28 is used to display an image. However, when an object is detected in proximity the display destination is switched from the liquid crystal monitor 28 to the in-viewfinder liquid crystal display 27.

That is, the proximity sensor 75 (the eyepiece sensor) detects an eye (a face, an object) in contact with an eyepiece of the viewfinder 77. Depending on a state detected by the proximity sensor 75, the system control unit 50 switches between a display ON state (in which an image is displayed) and a display OFF state (in which no image is displayed) of each of the liquid crystal monitor 28 and the in-viewfinder liquid crystal display 27. As the proximity sensor 75, for example, an infrared proximity sensor may be used to detect an object when the object comes into proximity of the eyepiece of the viewfinder 77 having the in-viewfinder liquid crystal display 27. When an object comes into proximity, infrared light emitted from a light emission unit (not shown) of the proximity sensor 75 is reflected by the object and is received by a light receiving unit (not shown) of the infrared proximity sensor. Based on the amount of received infrared light, it is also possible to determine how close the object is located to the eyepiece (the eyepiece distance). As described above, the proximity sensor 75 detects a distance of an object to the eyepiece. In a case where an object coming from a position apart from eyepiece (a position which is not in proximity) to the eyepiece of the viewfinder 77 is detected within a predetermined distance from the eyepiece of the viewfinder 77, it is determined that the object has come into contact with the eyepiece. In a case where the object detected as being in contact with the eyepiece (in proximity of the eyepiece) goes away beyond a predetermined distance, it is determined that the object has gotten away from the eyepiece. A threshold value for detecting the proximity to the eyepiece and a threshold value for detecting the separation from the eyepiece may be different from each other, which may be realized, for example, by providing hysteresis. After an object having come into contact with the eyepiece is detected, it is assumed that the object remains in the state in which the object is in contact with the eyepiece until the separation from the eyepiece is detected. After separation from the eyepiece is detected, it is assumed that the object is in the apart-from-eyepiece state until contact to the eyepiece is detected. Note that the infrared proximity sensor is an example, and any other sensor may be used as the proximity sensor 75 as long as it can detect an eye or an object when it comes in contact with the eyepiece.

Note that, the operation unit 70 includes, as one of its parts, a touch panel 70a capable of detecting contact with the liquid crystal monitor 28. Input coordinates on the touch panel 70a are associated with display coordinates on liquid crystal monitor 28. This makes it possible to configure a GUI (a graphical user interface) such that a user is allowed to perform inputting as if the user could directly operate the screen displayed on the liquid crystal monitor 28. The system control unit 50 is allowed to perform operations on the touch panel 70a or to detect states such as those described below.

- A finger or pen that is apart from the touch panel 70a comes into contact with the touch panel 70a. That is, the start of a touch (hereinafter, referred to as touch-down).
- A state in which the touch panel 70a is being touched with a finger or a pen (hereinafter, referred to as Touch-On).
- A state in which the finger or the pen is moving on the touch panel 70a while maintaining a contact with the touch panel 70a (hereinafter, referred to as touch-move).
- Releasing of the finger or the pen from the state in contact with the panel 70a. That is, ending of the touch (hereinafter, referred to as Touch-Up).
- A state in which nothing is touched on the touch panel 70a (hereinafter, referred to as touch-off).

When a touch-down is detected, a touch-on is also detected at the same time. After the touch-down is detected, the touch-on is usually continuously detected unless a touch-up is detected. A touch move is also detected when the touch-on is detected. Even if a touch-on is detected, a touch move is not detected unless a touch position is moving. When it is detected that all the touched fingers or pens have touched up, a touch-off state is detected.

These operations or states and the coordinates of the position where the finger or the pen is touching the touch panel 70a are notified to the system control unit 50 via the internal bus. The system control unit 50 determines what operation has been performed on the touch panel 70a based on the notified information. As for the touch move, the moving direction of the finger or the pen on the touch panel 70a can be determined for each of the vertical component and the horizontal component on the touch panel 70a based on the change in the position coordinates. When operations including touch-down, touch-move with a certain distance, and touch-up are serially performed on the touch panel 70a, it is determined that a stroke is drawn. An operation of drawing a stroke quickly is called a flick. The flick is an operation of quickly moving a finger on the touch panel 70a by a certain distance while keeping the finger in contact with the touch panel 70a and releasing the finger at the end of the certain distance. In other words, the flick is an operation of quickly tracing the finger on the touch panel 70a like an operation of flipping with a finger. The touch panel 70a can be of one of various types such as a resistive film type, a capacitive type, a surface acoustic wave type, an infrared type, an electromagnetic induction type, an image recognition type, an optical sensor type, or the like. A specific manner of performing a touch may be different depending on the type of touch panel 70a. In a type, when a touch panel is contacted with a finger or a pen, a touch is detected, while in another type, a finger or a pen is brought close to a touch panel, a touch is detected. The embodiment may be applicable to any manner of touching.

Next, a display process according to the first embodiment is described below with reference to FIG. 3. This process is realized by loading a program stored in the nonvolatile memory 56 into the system memory 52 and executing the program by the system control unit 50. This process starts when the digital camera 100 is turned on and it becomes possible to perform shooting.

Figure 5A:
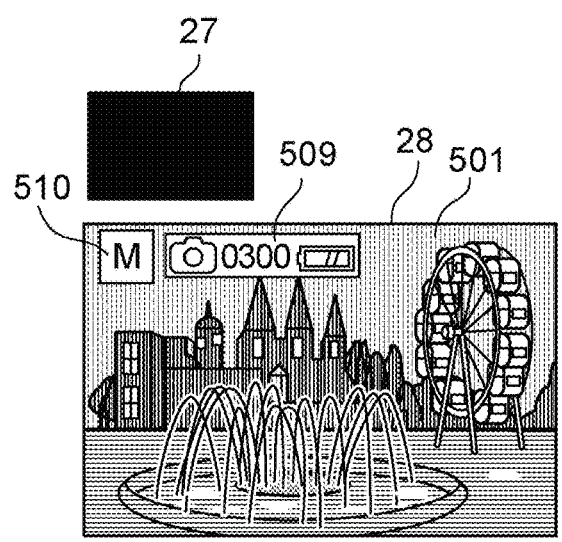
FIG. 5A is a diagram illustrating an example of a manner of displaying an image according to the first embodiment.

In S301, the system control unit 50 displays a live view image on the liquid crystal monitor 28. FIG. 5A to 5E illustrate examples of live-view images according to the first embodiment. In S301, a live view image 501 is displayed on the liquid crystal monitor 28 as shown in FIG. 5A. An item 509 indicates that it is allowed to capture 300 still images, and an item 510 indicates that the mode is the manual mode. In this state, no image is displayed on the in-viewfinder liquid crystal display 27.

In S302, the system control unit 50 determines whether or not a display destination switch instruction is issued by operating a button. That is, in S302, it is determined whether or not the display destination switch button 78 is pressed. In a case where it is determined that the display destination switch button 78 is pressed, the process proceeds to S303, but otherwise the process proceeds to S306.

In S303, the system control unit 50 determines whether or not the image is being displayed on the liquid crystal monitor 28. That is, it is determined whether or not an image is being displayed on the liquid crystal monitor 28, for example, as shown in FIG. 5A. In a case where it is determined that an image is being displayed on the liquid crystal monitor 28, the process proceeds to S304, but otherwise the process proceeds to S305.

Figure 5B:
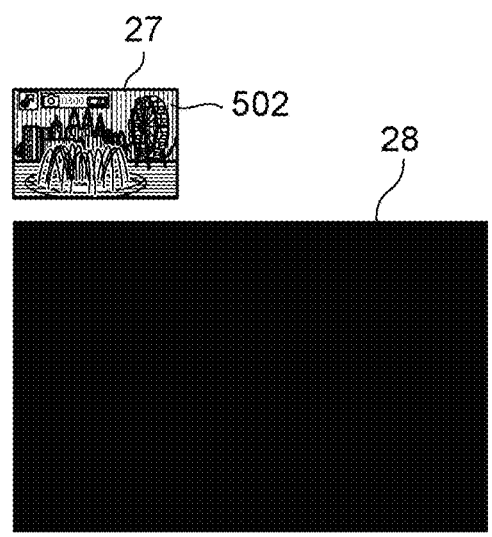
FIG. 5B is a diagram illustrating an example of a manner of displaying an image according to the first embodiment.

In S304, the system control unit 50 switches the display destination to the in-viewfinder liquid crystal display 27. The liquid crystal monitor 28 being in a state in which a live view image is shown as shown in FIG. 5A is switched to a state in which the live view image is not displayed as shown in FIG. 5B, while the in-viewfinder liquid crystal display 27 is switched to a state in which a live view image 502 is displayed.

In S305, the system control unit 50 switches the display destination to the liquid crystal monitor 28. In the case of S307, the state where the live view image is displayed on the in-viewfinder liquid crystal display 27 as shown in FIG. 5B is switched to the state where the live view image is displayed on the liquid crystal monitor 28. Note that also in a case where an image is not displayed on either the in-viewfinder liquid crystal display 27 or the liquid crystal monitor 28, the liquid crystal monitor 28 is turned on in the display ON state. In a case where a user is looking into the viewfinder 77, the proximity sensor 75 detects the user and the in-viewfinder liquid crystal display 27 is turned on into the display ON state. Note that the state in which an image is not displayed on either display may occur when a user is probably watching the liquid crystal monitor 28.

In S306, the system control unit 50 determines whether or not a mode switch instruction is issued. Note that the mode switch instruction can be issued by operating the mode switch 60. In a case where it is determined that the mode switch instruction is issued, the process proceeds to S307, but otherwise the process proceeds to S308.

In S307, the system control unit 50 switches the operation mode based on the mode switch instruction detected in S306.

In S308, the system control unit 50 determines whether or not an instruction to start interval shooting is issued. The instruction to start the interval shooting can be issued by pressing the shutter button 61 or touching a shooting start instruction item (not shown). In a case where it is determined that the instruction to start interval shooting is issued, the process proceeds to S409, but otherwise the process proceeds to S411. In a case where the operation mode is in the interval shooting mode, but shooting is not yet started, or in a case where the shooting start instruction is issued in a mode other than the interval shooting mode, the determination in S308 is No. Modes other than the interval shooting mode may include a mode in which a still image or a moving image is captured in a mode other than a time-lapse shooting mode, a playback mode, a menu screen display mode, etc.

Figure 4:
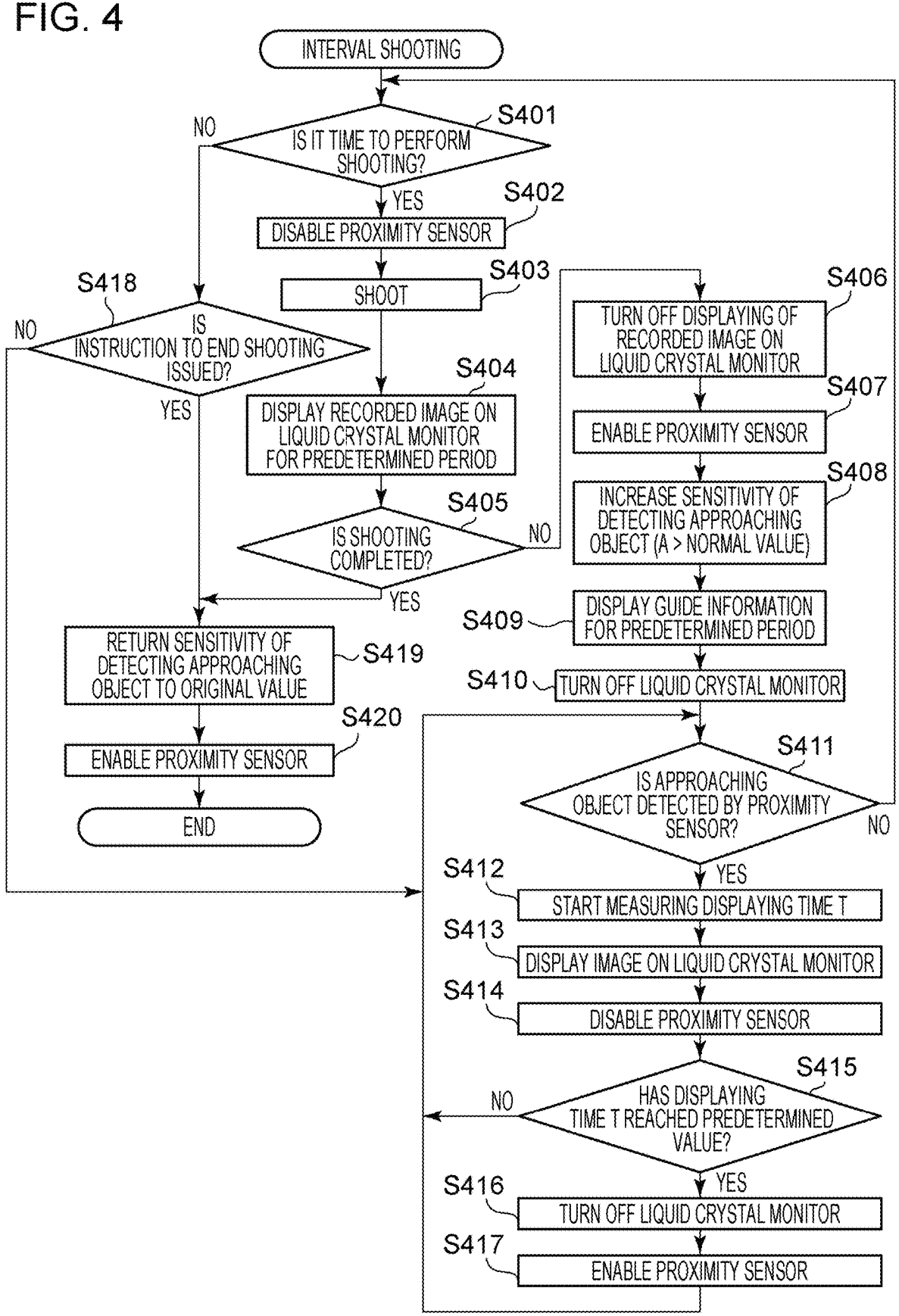
FIG. 4 is a flow chart illustrating processing in an interval shooting mode according to the first embodiment.

In S309, the system control unit 50 performs a display process during the interval shooting (during an interval period). The display process in the interval shooting mode will be described later with reference to FIG. 4.

In S310, the system control unit 50 determines whether or not the proximity sensor 75 detects an object that has come into proximity. In a case where the capacitance method is used, it is determined whether or not a change occurs in capacitance equal to or greater than a threshold value. In modes other than the interval shooting mode, a normal value is used as the threshold value for detecting the object coming into proximity. For example, the threshold value is set such that when an approaching object has come to a position 1.5 or 3 centimeters apart from the viewfinder 77, the object is regarded as being in proximity. In a case where it is determined that the proximity sensor 75 has detected an object in proximity, the process proceeds to S311, but otherwise the process proceeds to S314.

In S311, the system control unit 50 displays an image on in-viewfinder liquid crystal display 27. That is, a live view image is displayed on the in-viewfinder liquid crystal display 27 as in the case where the display destination is switched from the state shown in FIG. 5A to the state shown in FIG. 5B.

In S312, the system control unit 50 determines whether or not the proximity sensor 75 no longer detects an object in proximity. That is, it is determined whether or not a transition occurs from the state where the object in proximity is detected in S310 to the state where no object is detected in proximity. In a case where it is determined that the object is no longer detected in proximity, the process proceeds to S313, but otherwise the process proceeds to S314.

In S313, the system control unit 50 displays an image on the liquid crystal monitor 28. That is, a live view image is displayed on the liquid crystal monitor 28 as in the case where the display state is switched from that shown in FIG. 5B to that shown in FIG. 5A.

In S314, the system control unit 50 determines whether a shooting instruction has been issued. In a case where it is determined that a shooting instruction has been issued, the process proceeds to S315, but otherwise the process proceeds to S316. The shooting instruction may be issued by pressing the shutter button 61.

In S315, the system control unit 50 performs a shooting process. In the shooting process, a still image is shot in the still image shooting mode, and a moving image is shot in the moving image shooting mode.

In S316, the system control unit 50 determines whether to end the display process. The display process can be ended by turning off the power of the digital camera 100.

In S310 to S315, the display control in operation modes other than the interval shooting mode has been described. In operation modes other than the interval shooting mode, in response to detecting an object coming into proximity by the proximity sensor 75, an image is displayed on the in-viewfinder liquid crystal display 27 in the viewfinder 77. This allows a user to determine a composition while looking into the viewfinder 77 and viewing a live view image displayed on the in-viewfinder liquid crystal display 27.

Note that in a case where the operation mode is a mode other than the shooting mode, for example, in a case where the operation is a playback mode or in a case where a menu screen is displayed, not the live view image but a playback image or a menu screen is displayed on the in-viewfinder liquid crystal display 27 or the liquid crystal monitor 28. Next, a display process in interval shooting is described below with reference to FIG. 4. This process is realized by loading a program from the nonvolatile memory 56 into the system memory 52 and executing the program by the system control unit 50. This process starts when the process proceeds to S309 in FIG. 3.

In S401, the system control unit 50 determines whether or not it is time to capture an image in the interval shooting. In the interval shooting, setting may be made on a menu screen, for example, such that shooting is performed every 10 seconds with an exposure time of 5 seconds for a period of 5 hours, or shooting is performed every one hour with manual setting for a period of 10 days, or the like. In S401, it is determined, based on the set interval shooting information, whether or not shooting timing has come. For example, in a case where the shooting interval is 5 minutes, it is determined whether 5 minutes have elapsed since the last shooting. In the case of first image capturing, S401 is determined as Yes. When the interval shooting is started, as shown in item 504 in FIG. 5C, an item indicating that shooting is in progress is displayed. The settings in terms of the number of shots, shooting time, and shooting interval are stored in the system memory 52.

In S402, the system control unit 50 disables the proximity sensor 75. Since the proximity sensor 75 does not perform the processing during the shooting (during the exposure) and during rec review, which will be described later, the proximity sensor 75 is turned off in S402 to save power.

In S403, the system control unit 50 performs a shooting process based on the interval shooting information, and records an image acquired by the image sensing unit 22 in the recording medium 200.

Figure 5C:
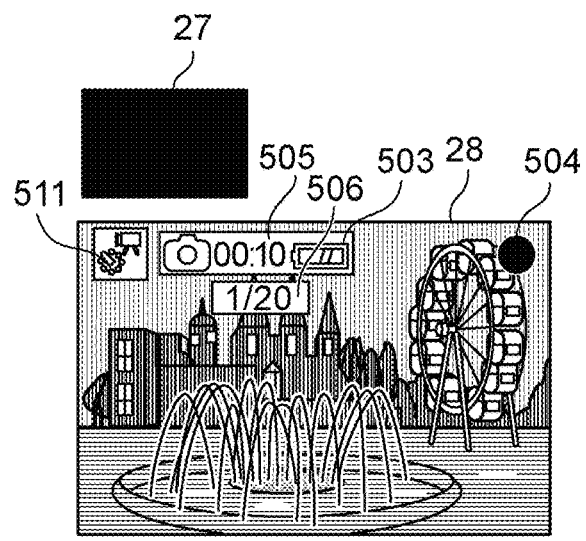
FIG. 5C is a diagram illustrating an example of a manner of displaying an image according to the first embodiment.

In S404, the system control unit 50 displays a recorded image 503 captured in immediately preceding interval shooting. The recorded image 503 (the image recorded in the immediately preceding step S403) is displayed on the liquid crystal monitor 28, and shooting information on the interval shooting is also displayed as shown in FIG. 5C. An item 511 is an item indicating that the operation is in the interval shooting mode. The interval shooting information is information indicating the shooting interval and the number of times of shooting in the interval shooting, which are indicated by items such as items 505 and 506 shown in FIG. 5C. The item 505 indicates the shooting interval, and the item 506 indicates the number of times of shooting. The number of shooting is displayed in the form of (the number of shots already captured)/(the set number of shots), such as 1/20, 4/20, or the like or in the form of (elapsed time from the start of shooting)/(total set time). In a case where the brightness of a subject is low as in a case where a night scene is captured, the interval shooting information may be displayed in a dark part (in red color) such that dark adaptation is not released. By continuing the rec review display immediately after the interval shooting, the user can confirm whether the shooting has been completed and the desired composition has been obtained. The rec review display time in the interval shooting may be shorter than the rec review display time in a normal still image shooting mode.

In S405, the system control unit 50 determines whether or not the shooting is completed. The interval shooting is completed when the set number of shots are captured or when the set shooting time has elapsed. In a case where it is determined that the shooting is completed, the process proceeds to S419, but otherwise the process proceeds to S406.

In S406, the system control unit 50 turns off the liquid crystal monitor 28 such that the rec review image (the recorded image) displayed on the liquid crystal monitor 28 in S404 is not displayed.

In S407, the system control unit 50 enables the proximity sensor 75.

In S408, the system control unit 50 sets the detection sensitivity to an approaching object so as to be higher than in the case other than the interval shooting period (sensitivity A) such that (sensitivity A)>(normal sensitivity in modes other interval shooting mode). In the case of the capacitance method, a threshold value for determining that an object has come into the proximity is set to be small. For example, in shooting modes other than the interval shooting mode, when an object comes to a close position 1.5 cm or 3 cm is apart from the proximity sensor, it is determined that the object in the proximity is detected. However, in the interval shooting, the setting is made such that an object in the proximity is detected when the object is at a larger distance, for example, 4 cm or 6 cm apart from the proximity sensor. In the interval shooting, in response to detecting an object coming into proximity by the proximity sensor 75 as described later, the liquid crystal monitor 28 is turned on into the display ON state. The sensitivity may be increased such that the liquid crystal monitor 28 is turned on into the display ON state when a user's hand or the like is brought to a position which is moderately close to the proximity sensor 75 but which is not as close as when the user looks into the viewfinder 77. This can reduce the possibility for a user to touch the digital camera 100 unintentionally to bring his/her hand close to the proximity sensor 75. In the interval shooting, to re-perform shooting after once shooting is started, it will take a long time. In a case where a user is aiming for a rare opportunity to capture an image such as a rare natural phenomenon, if the user misses the opportunity, it may be difficult to have such an opportunity again. In view of the above, the sensitivity may be increased to reduce the possibility that the user unintentionally touches the digital camera 100 in an attempt to display an image on the liquid crystal monitor 28 thereby preventing the composition from being easily changed unintentionally. After shooting is started, it is unlikely that a user performs a button operation, a touch operation, or the like while holding the camera (holding the camera with both hands). Therefore, even if the sensitivity is increased, the possibility is low that the operability is reduced, because the possibility of performing other operations is low.

Figure 5D:
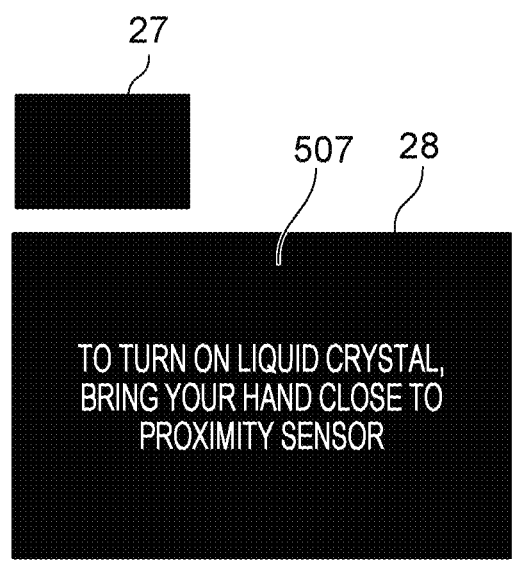
FIG. 5D is a diagram illustrating an example of a manner of displaying an image according to the first embodiment.

In S409, the system control unit 50 displays a guide on the liquid crystal monitor 28 for a predetermined time. More specifically, a guide 507 such as that shown in FIG. 5D is displayed to inform that the liquid crystal is turned on when the user's hand is brought close to the proximity sensor. This makes it possible for the user to understand that the liquid crystal is turned on by bringing the user's hand close to the proximity sensor 75, and that a captured image or a progress of interval shooting can be confirmed on the liquid crystal. The predetermined time may be, for example, 5 or 7 seconds. After the guide 507 has been displayed for the predetermined time, the system control unit 50 turns off the liquid crystal monitor 28 to save power. The displaying the guide in S409 may be performed only in the first shooting.

In S410, the system control unit 50 turns off displaying of information such as shooting information related to the interval shooting displayed on the liquid crystal monitor 28. By turning off the power supply to the liquid crystal monitor 28 itself, it becomes possible to save power. Note that the liquid crystal monitor 28 is turned off such that even if a timer for turning off the display is set (such that when no operation is performed for a set time such as 10 seconds, 20 seconds, 30 seconds, 1 minute, etc., the liquid crystal monitor 28 is turned off), the liquid crystal monitor 28 is turned off before the set time expires. That is, even if the timer for turning off the display is set to 10 seconds, the liquid crystal monitor 28 is turned off two seconds after the rec review. By shortening the time in which the liquid crystal monitor 28 is in the display ON state as much as possible as described above, it is possible to further save power.

Figure 3:
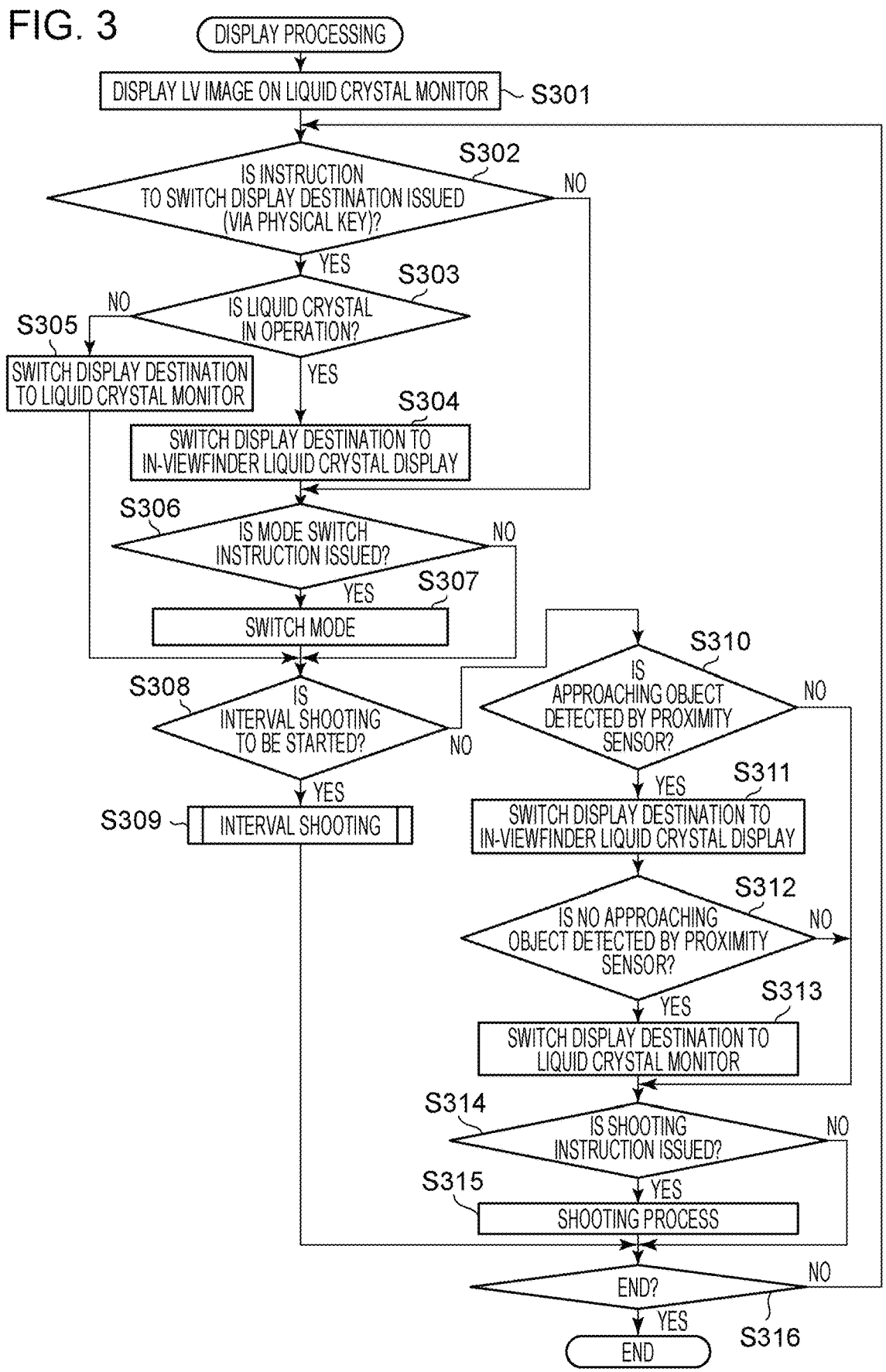
FIG. 3 is a flow chart illustrating a display process according to the first embodiment.

In S411, as in S310 in FIG. 3, the system control unit 50 determines whether or not the proximity sensor 75 has detected an object that has come into proximity. The determination in S411 is made based on the sensitivity set in S408. In a case where it is determined that the proximity sensor 75 has detected an object in proximity, the process proceeds to S412, but otherwise the process proceeds to S401. Note that in the determination in S411, the determination result may be Yes when the proximity sensor 75 detects an object in proximity continuously for a predetermined time or more. This prevents the liquid crystal monitor 28 from being turned on into the display ON state when a user unintentionally brings his/her hand or an object to a position close to the proximity sensor 75 only for a short time or when a user passes by the proximity sensor 75.

In S412, the system control unit 50 starts measuring the display time T. The display time T is an elapsed time from when the liquid crystal monitor 28 is turned on into the display ON state in response to detecting an object into proximity by the proximity sensor 75. The display time T is counted up as long as an object in the proximity is detected. When the display time T, counted from when an object detected in the proximity becomes no more detectable in the proximity, has reached a predetermined value, the liquid crystal monitor 28 is turned off.

In S413, the system control unit 50 displays a recorded image (an image recorded in the recording medium 200) captured in immediately preceding interval shooting on the liquid crystal monitor 28. That is, in a case where the image is captured in the nth shooting, this image is displayed. In S413, in response to detecting a user's hand or finger in proximity in S411, a recorded image 503 displayed as shown in FIG. 5C.

In S414, the system control unit 50 disables the proximity sensor 75. That is, since displaying of the recorded image is started in S413, the proximity sensor 75 is disabled thereby saving power.

In S415, the system control unit 50 determines whether or not the display time T has reached a predetermined value. The predetermined value may be, for example, 10 or 20 seconds. The reason why the display time T is limited as described above is that because the interval shooting is performed over a long time, if the liquid crystal monitor 28 is continuously in the display ON state, the result is an increase in power consumption. Thus, in response to the determination that a user has an intention to view the display (S411), the liquid crystal monitor 28 is turned on and is maintained in the display ON state for a predetermined time, and the liquid crystal monitor 28 is turned off into the display OFF state at the end of the predetermined time. In a case where it is determined that the display time T has reached a predetermined time, the process proceeds to S416, but otherwise the process proceeds to S401.

In S416, the system control unit 50 turns off the liquid crystal monitor 28 into the display OFF state. Note that in this case, the in-viewfinder liquid crystal display 27 is not turned on into the display ON state when the liquid crystal monitor 28 is turned off into the display OFF state.

In S417, the system control unit 50 enables the proximity sensor 75 such that it becomes possible to detect an object approaching the proximity sensor 75.

Figure 5E:
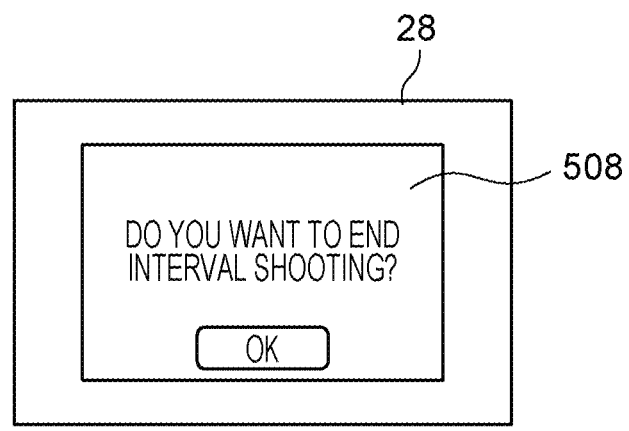
FIG. 5E is a diagram illustrating an example of a manner of displaying an image according to the first embodiment.

In S418, the system control unit 50 determines whether or not a shooting end instruction is issued. The shooting end instruction can be issued by pressing the shutter button 61 in the shooting or by touching a shooting end instruction item (not shown). In a case where a shooting end instruction is issued by a user by pressing the shutter button 61 or performing a touch operation, a confirmation screen 508 such as that shown in FIG. 5E is displayed. On the confirmation screen 508, a user is asked whether to end the interval shooting, which prevents the interval shooting from being ended unintentionally. If "OK" on the confirmation screen 508 is touched, the shooting is ended. In a case where it is determined that the shooting end instruction is issued, the process proceeds to S419, but otherwise the process proceeds to S411.

In S419, the system control unit 50 returns the sensitivity (sensitivity A) in detecting an approaching object to the normal sensitivity used in operation modes other than the interval shooting mode. In operation modes other than the interval shooting mode, for example, in the still image mode or when the menu screen is displayed, in many cases, operations are performed while holding the camera. In this case, if the sensitivity is kept high, there is a possibility that the display destination is switched to the in-viewfinder liquid crystal display 27 when a user tries to operate the touch panel 70a. Thus, by returning the sensitivity to the normal value, an improved operability is achieved in the operation modes other than the interval shooting mode.

In S420, the system control unit 50 returns the sensitivity of the approaching object detection to the original sensitivity. That is, when the interval shooting is completed, the sensitivity is returned to the original value such that even if a user's hand is brought close to the camera for setting the interval shooting or issuing a shooting instruction, the liquid crystal monitor 28 is prevented from being easily and unintentionally turned on. In the interval shooting, an image of, for example, fireflies, starry sky, or the like is often captured. If the display surface is unnecessarily brightened, high brightness may cancel adaptation to darkness in shooting performed by another photographer. In view of the above, the liquid crystal monitor 28 is controlled not to be easily turned on over a whole period in which a user is waiting for a timing of issuing an interval shooting instruction while putting his/her hand on the shutter button 61 or the user is waiting for a timing of touching the touch panel 70a while keeping his/her finger close to the touch panel 70a.

According to the embodiment described above, a user is allowed to display a captured image and/or shooting information on the liquid crystal monitor 28 by bringing an object such as a user's hand or finger close to the proximity sensor 75 during the interval shooting. That is, the user can easily turn on the liquid crystal monitor 28 into the display ON state without pressing a button. The unnecessity of touching the digital camera 100 prevents the position of the digital camera 100 from being easily shifted in the interval shooting. In a case where an image is displayed on in-viewfinder liquid crystal display 27 in response to detecting an object approaching the proximity sensor 75, a user has to look into the viewfinder 77. In this case, when the user bring his/her face close to the viewfinder 77, there is a possibility that the user's nose or forehead hits the digital camera 100, which may cause the position of the digital camera 100 to be shifted. In a case where a user is holding the camera in a mode other than interval shooting, it may be better to display the image in the viewfinder 77. However, in the interval shooting, displaying the image on the liquid crystal monitor 28 allows it to prevent the position of the digital camera 100 from being shifted.

In a case where the user is looking into the viewfinder 77 at the start of the interval shooting, the image may be kept displayed on the in-viewfinder liquid crystal display even when the user removes his/her eye from the viewfinder 77 after the shooting is started. This is because when the user is looking into the viewfinder 77, the user is likely to want to prevent the light on the display surface from leaking outside. In shooting of fireflies or animals, if light leaks, an object may notice, or it may become difficult to continue shooting. In view of the above, in a case where the user is looking into the viewfinder 77, displaying in the viewfinder 77 may be maintained. The guide 507 may also be displayed on the in-viewfinder liquid crystal display 27.

Second Embodiment

A second embodiment discloses an example in which the present invention is applied to a smartphone. In the digital camera 100 according to the first embodiment described above, the displaying destination is switched between the in-viewfinder liquid crystal display 27 and the liquid crystal monitor 28. In the second embodiment described below, the state of the liquid crystal monitor 128 is switched between the display ON state in which an image is displayed and the display OFF state in which no image is displayed. In the interval shooting using a smartphone, as in the case of the interval shooting according to the first embodiment, it is possible to prevent the composition from shifting by preventing the smartphone device from being touched by something.

Figure 6A:
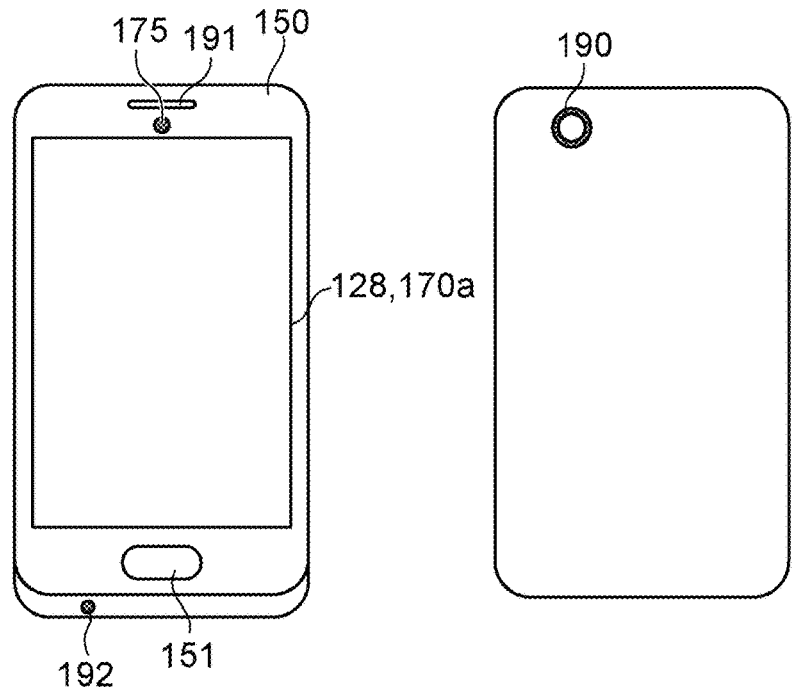
FIG. 6A is an external view of a smartphone according to the second embodiment.
Figure 6B:
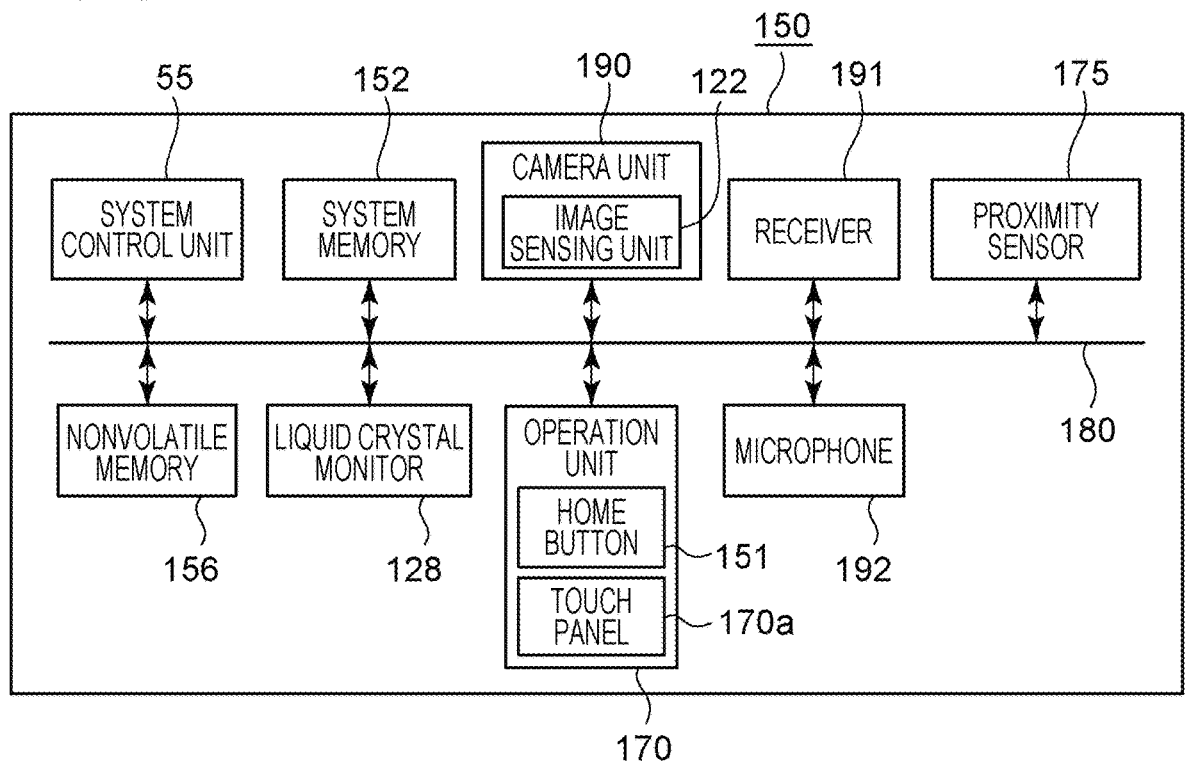
FIG. 6B is a block diagram related to the second embodiment.

FIG. 6A is an external view of a smartphone 150 which is an example of a display control apparatus according to the present invention. FIG. 6B is a block diagram illustrating an example of a configuration of a digital camera 100 which is an example of a display control apparatus according to the present invention.

In FIG. 6A, the liquid crystal monitor 128 is a display unit that displays images and various kinds of information, and is integrated with a touch panel 170a. The liquid crystal monitor 128 and the touch panel 170a are capable of detecting a touch on the display of the liquid crystal monitor 128, as in the first embodiment.

The proximity sensor 175 is a detection unit configured to detect whether an object has come into proximity. That is, the proximity sensor 175 is a detection unit for detecting approaching of an ear (a face). When a user brings his/her ear close to a receiver 191 to try to hear a voice/sound from the receiver 191, the proximity sensor 175 detects approaching of the ear. The receiver 191 is a voice/sound output unit configured to output a voice of a communication partner during a communication. The proximity sensor 175 is disposed near the receiver 191 to make it easier to determine whether a user is put his/her ear close to the receiver 191 for communication. A home button 151 is an operation unit for transitioning to a home screen when the home button 151 is pressed. A microphone 192 is a voice input unit for inputting a voice during a call or the like. A camera 190 is a camera unit for capturing a still image, a moving image, and the like.

In FIG. 6B, a system control unit 55, a system memory 152, the camera 190, the receiver 191, the proximity sensor 175, a nonvolatile memory 156, the liquid crystal monitor 128, the operation unit 170, and the microphone 192 are connected to an internal bus 180 such that data can be exchanged with each other via the internal bus 180. Note that the system control unit 55, the system memory 152, the proximity sensor 175, the nonvolatile memory 156, and the operation unit 170 are similar to those in the embodiment of the digital camera. Therefore, a further description thereof is omitted. The camera 190 includes an image sensing unit 122, and can display an image captured by the image sensing unit 122 on the liquid crystal monitor 128 or can save the image in the nonvolatile memory 156. In a telephone call, the receiver 191 converts a digital signal received by the smartphone 150 into an analog signal and outputs a resultant voice/sound. The microphone 192 converts an input voice/sound into a digital signal. During a telephone call, converted digital data is transmitted to a communication destination thereby achieving a conversation. By analyzing the input data and causing the smartphone 150 to recognize the input data, it is possible to operate the smartphone 150 via a voice.

Figure 7:
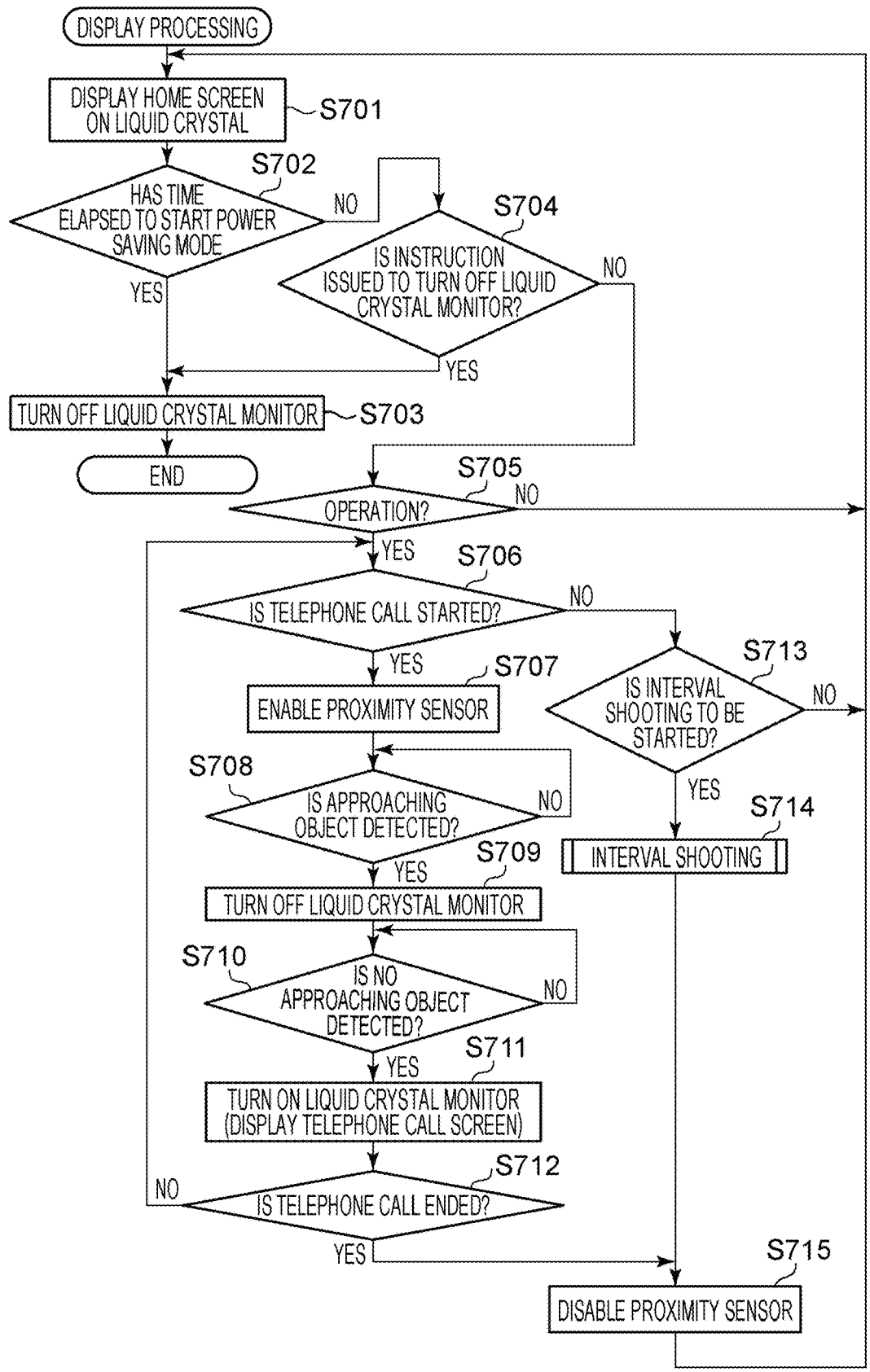
FIG. 7 is a flow chart illustrating a display process according to the second embodiment.

Next, referring to FIG. 7, a display process according to the second embodiment is described below. This processing is realized by loading a program stored in the nonvolatile memory 156 into the system memory 152 and executing the program by the system control unit 50. Note that this process starts when power of the smartphone 150 is turned on which makes it possible to perform shooting.

In S701, the system control unit 55 displays a home screen on the liquid crystal monitor 128. On the home screen, items each corresponding to an application such as a camera, a call, and an email are displayed.

In S702, the system control unit 55 determines whether a power saving time has elapsed. The power saving time is a time which is set by a user and which is allowed to elapse before the liquid crystal monitor 128 is turned off (into a non-displaying state). When the user performs a button operation or a touch operation, the power saving time count becomes zero. That is, it is determined whether or not a non-operation time has reached a predetermined value or more. The power saving time is set by the user by selecting values such as 30 seconds or 2 minutes. In a case where it is determined that the power saving time has elapsed, the process proceeds to S703, but otherwise the process proceeds to S704.

In S703, the system control unit 55 turns off the liquid crystal monitor 128 into the display OFF state and ends the display processing.

In S704, the system control unit 55 determines whether or not an instruction is issued to turn off the liquid crystal monitor 128 into the display OFF state. Each time the home button 151 is pressed, an instruction is issued to switch the state of the liquid crystal monitor 128 between the display ON state and the display OFF state. In a case where it is determined that an instruction to turn off the liquid crystal monitor 128 into the display OFF state is issued, the process proceeds to S703, but otherwise the process proceeds to S705.

In S705, the system control unit 55 determines whether or not an operation is performed by a user. Examples of operations by the user include receiving of an incoming call, transmitting of a call, issuing an instruction to start interval shooting, setting of a menu, and the like. In a case where it is determined that an operation is performed by a user, the process proceeds to S706, but otherwise the process proceeds to S701.

Figure 8A:
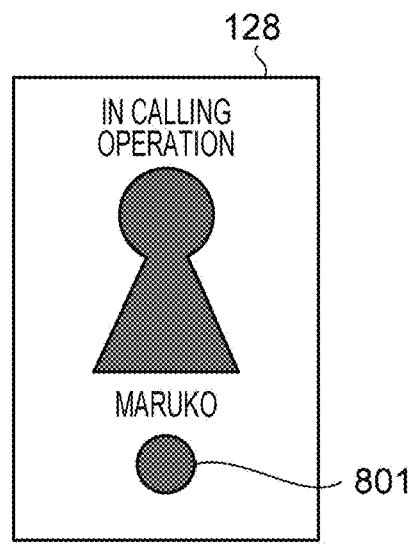
FIG. 8A is a diagram illustrating an example of a manner of displaying an image according to the second embodiment.

In S706, the system control unit 55 determines whether or not the operation determined to have been performed in S705 is a call start operation. FIGS. 8A to 8F illustrate examples of images/information displayed on the liquid crystal monitor 128 according to the second embodiment. When a call is started, the determination in S706 is made as Yes as shown in FIG. 8A. In a case where it is determined that a call start operation (including a waiting state in which the call is received by the other party) is performed, the processing proceeds to S707, but otherwise the processing proceeds to S713.

In S707, the system control unit 55 enables the proximity sensor 175. In this case, the sensitivity of the proximity sensor 175 is set such that an object is detected when the object comes to a close position 5 millimeters or 1 centimeter apart from the proximity sensor 175.

In S708, the system control unit 55 determines whether the proximity sensor 175 has detected an object which has come into proximity. In a case where the proximity sensor 175 detects an object in proximity, the process proceeds to S709, but otherwise S708 is repeated until approaching an object is detected. Note that operations related to a call such as touching an item, adjusting volume, ending a call, or the like are accepted.

Figure 8B:
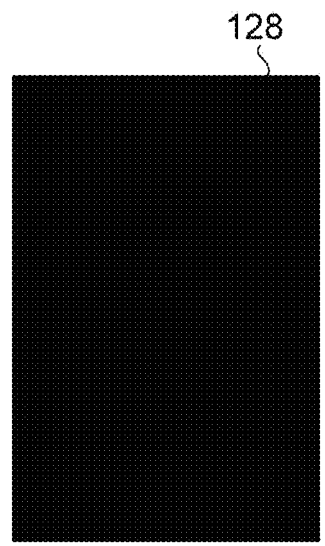
FIG. 8B is a diagram illustrating an example of a manner of displaying an image according to the second embodiment.

In S709, the system control unit 55 turns off the liquid crystal monitor 128 so as to display nothing and does not accept a touch operation. That is, as shown in FIG. 8B, the liquid crystal monitor 128 is turned off so as to display nothing, and any touch operation is not accepted. Alternatively, no touch operation may be accepted while maintaining the liquid crystal monitor 128 in the display ON state in which an image is displayed. This makes it possible to prevent an unintentional process from being performed when a user's face comes into contact with the liquid crystal monitor 128 during a call.

In S710, the system control unit 55 determines whether or not the object detected in the proximity is no longer detected by the proximity sensor 175. In a case where the object detected in the proximity is no longer detected by the proximity sensor 175, the process proceeds to S711, but otherwise, S710 is repeated until the object detected in the proximity is no longer detected by the proximity sensor 175. Note that, as in S708, an operation by the user is accepted.

In S711, the system control unit 55 turns on the liquid crystal monitor 128 into the display ON state. That is, the state is transitioned from the state shown in FIG. 8B to the state shown in FIG. 8A.

In S712, the system control unit 55 determines whether the call is ended. The call can be ended by touching an item 801 in FIG. 8A. In a case where it is determined that the call has ended, the process returns to S701, but otherwise the process proceeds to S715.

Figure 8C:
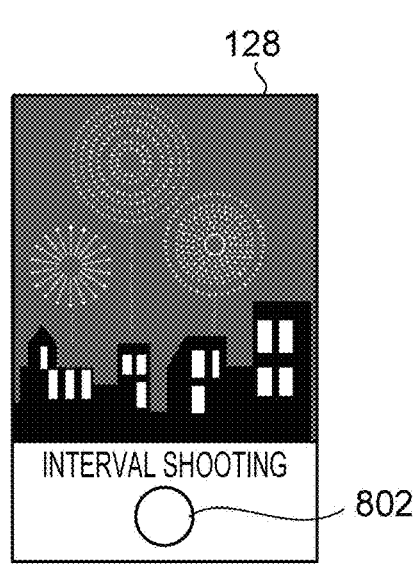
FIG. 8C is a diagram illustrating an example of a manner of displaying an image according to the second embodiment.

In S713, the system control unit 55 determines whether the operation detected in S705 is an operation of issuing an instruction to start interval shooting. In a case where the operation is an operation of issuing of an interval shooting start instruction, the process proceeds to S714, but otherwise the process returns to S701. FIG. 8C is a screen for receiving an instruction to start interval shooting. When an item 802 is touched, interval shooting is started.

In S714, the system control unit 55 performs a displaying process during interval shooting (during an interval period). The displaying process in the interval shooting mode is similar to that described above with reference to FIG. 4.

In S715, the system control unit 50 disables the proximity sensor 75 so as not to detect an object even when the object has come into proximity. By disabling the proximity sensor 75 as described above, it is possible to save power.

However, in the second embodiment, in the process corresponding to S406, the rec review is not displayed as shown in FIG. 8B.

In the second embodiment, in the process corresponding to S413, an item 804 indicating shooting information is displayed together with a captured image 803.

Figure 8D:
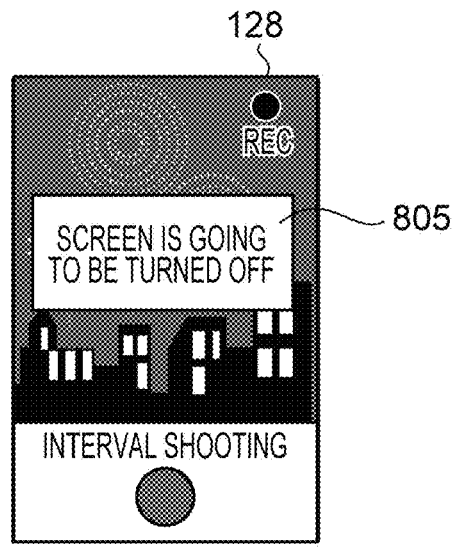
FIG. 8D is a diagram illustrating an example of a manner of displaying an image according to the second embodiment.
Figure 8E:
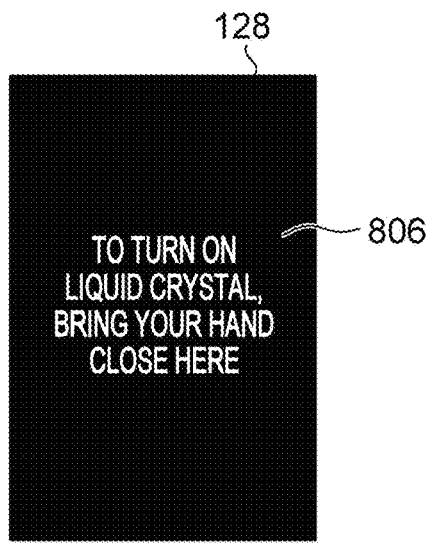
FIG. 8E is a diagram illustrating an example of a manner of displaying an image according to the second embodiment.
Figure 8F:
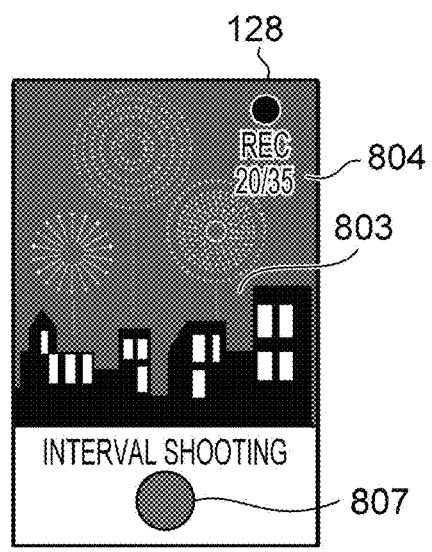
FIG. 8F is a diagram illustrating an example of a manner of displaying an image according to the second embodiment.

In the second embodiment, in the process corresponding to S409, a guide 806 such as that shown in FIG. 8E is displayed to inform that the liquid crystal is turned on when the user's hand is brought close to the proximity sensor.

In S418, when an item 807 for ending the interval shooting illustrated in FIG. 8E is touched, the interval shooting is ended.

In S406 and S416, before the liquid crystal monitor 128 is turned off, a guide 805 such as that shown in FIG. 8D may be displayed to inform that the screen is going to be turned off (such that nothing is displayed).

According to the embodiment described above, a user can turn on the liquid crystal monitor 128 to display a captured image and/or shooting information by bringing an object such as a hand or a finger close to the proximity sensor 175 during the interval shooting. This allows the user to easily turn on the liquid crystal monitor 128 without pressing the button. Because the user does not need to touch the smartphone 150 to turn on the liquid crystal monitor 128, shifting in the position of the smartphone 150 does not easily occur during the interval shooting.

Normally, the proximity sensor 175 in the smartphone starts detection when a call is started, and turns off the liquid crystal monitor 128 when an object comes into proximity of the proximity sensor 175. As described above, by enabling the proximity sensor 175 during interval shooting, it becomes possible to turn on the liquid crystal monitor 128 into the display ON state when an object in proximity of the proximity sensor 175 is detected.

The first embodiment and the second embodiment may be modified as follows.

Increasing the sensitivity of the proximity sensor 75 (175) may increase power consumption. To handle the above situation, when the sensitivity is increased, an object search interval may be set to be longer than usual, or the camera may be set such that increasing the sensitivity is not allowed.

Alternatively, in a state in which interval shooting is being performed and the liquid crystal monitor 28 (128) is already turned on and thus an image is being displayed, if the proximity sensor 75 (175) detects an object coming into proximity, the liquid crystal monitor 28 (128) may be turned off to save power.

Note that the proximity sensor 75 (175) may be a camera. In a case where a camera is used as the proximity sensor 75, if the object (subject) detected in proximity is an eye, there is a high possibility that a user wants to check an image or information displayed on the in-viewfinder liquid crystal display 27. Therefore, in this case, the in-viewfinder liquid crystal display 27 may be turned on as in the normal mode.

In a case where the liquid crystal monitor 28 is a vari-angle liquid crystal display and its display screen is closed against the camera, a user cannot view an image or information displayed on the liquid crystal monitor 28 even when the image or information is displayed on the liquid crystal monitor 28, and thus the image or information is displayed on the in-viewfinder liquid crystal display 27.

In the middle of interval shooting, a user may want change setting of shooting after the user views an image or information displayed on the liquid crystal monitor 28 (128). Even if an image can be displayed on the liquid crystal monitor 28 (128) without touching a device having the image sensing unit 22 (122), if the camera is moved when the setting is changed, a change may occur in the composition. Therefore, it is more desirable to perform inputting by a gesture or a touch operation than by operating an operation part which may generate greater vibrations. Therefore, in a case where the touch operation or the gesture operation are disabled, when the liquid crystal monitor 28 is turned on into the display ON state in S407, the touch operation or the gesture operation may be forcibly enabled to reduce the possibility of a failure.

In this situation, the sensitivity of the touch panel 70a (170a) may be increased. A remote control may be enabled in response to detecting an object in proximity by the proximity sensor 75 (175). For example, a setting related to interval shooting may be accepted from a smartphone or a remote controller thereby making it possible to change the setting without touching the digital camera 100.

Note that the detection of an object coming into proximity may be performed by the touch panel 70a (170a) with increased sensitivity instead of the proximity sensor 75 (175).

In a case where an image is displayed on the liquid crystal monitor 28 in the middle of interval shooting, an image synthesized from images captured before or a moving image generated from images captured before, or a live view image may be displayed instead of an image captured immediately Note that the second embodiment is applicable also to a digital camera which does not have the viewfinder 77.

Furthermore, a threshold value of time for detecting an object in proximity of the proximity sensor 75(175) may be provided. Furthermore, when an object is detected in proximity continuously, for example, for 0.5 seconds or 1 second, only information on the interval shooting may be displayed, while when an object is detected in proximity for a long time such as 1.5 seconds or 2 seconds, a recorded image may be displayed.

In the embodiments described above, explanations have been given, by way of example, for the case in which interval shooting is performed. However, the embodiments may be applied also to long exposure. More specifically, when a hand or a finger in proximity of the proximity sensor 75 (175) is detected in the middle of the long exposure, an image may be displayed on the liquid crystal monitor 28 (128). In this case, if the image is displayed unnecessarily on the liquid crystal monitor 28 (128) in the middle of the long exposure, the subject may be brightened. Therefore, in the long exposure, an image may be displayed when an object in the proximity is detected by the proximity sensor 75 for a predetermined time or longer. The long exposure has an exposure time, for example, equal to or longer than 10 seconds over which the exposure is maintained.

The various controls described above as being performed by the system control unit 50 or the system control unit 55 may be performed by one piece of hardware, or may be performed by a plurality of pieces of hardware such that the total control of the apparatus is shared by the plurality of pieces of hardware.

Although the present invention has been described in detail above with reference to the preferred embodiments, the present invention is not limited to these specific embodiments, and various other forms are possible without departing from the scope of the present invention. Also not that any of the above-described embodiments is merely an example embodying the present invention. Two or more embodiments may be appropriately combined.

In the embodiments described above, by way of example, the present invention is applied to the digital camera 100 or the smartphone 150. However, the present invention is not limited to these examples, but the invention may be applied to many display control apparatuses capable of controlling displaying an image using a proximity sensor. That is, the present invention is applicable to a mobile phone terminal, a portable image viewer, a printer apparatus, a digital photo frame, a music player, a game machine, an electronic book reader, a home appliance, a tablet PC, and the like, which have a viewfinder.

Note that the present invention is applicable not only to a display apparatus itself but also to a control apparatus configured to communicate with the display apparatus (or a network camera or the like) via a wired or wireless communication channel to remotely control the display apparatus. Specific examples of apparatuses that remotely control the display apparatus include a smartphone, a tablet PC, a desktop PC, and the like. By notifying the display apparatus of commands for performing various operations and settings based on an operation or a process performed on the control apparatus, the display apparatus can be remotely controlled. Furthermore, the control apparatus may receive a live view image captured by the display apparatus via a wired or wireless communication channel and may display the received live view image on the control apparatus.

Other Embodiments

The present invention may also be realized by performing a process described below. That is, software (a program) for realizing one or more functions according to one or more embodiments described above is provided to a system or an apparatus via a network or one of various kinds of storage media. A computer (or a CPU, an MPU, or the like) in the system or the apparatus reads out the program and executes it. The present invention may also be realized by a circuit (such as an ASIC) configured to realize one or more functions described above. Note that the program and the storage medium in which the program is stored fall into the scope of the present invention.

According to the present invention, it is possible to display an image on a display unit such that the displaying does not cause a significant influence on a shooting result.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A display control apparatus comprising:
   a detector configured to detect that an object has approached; and
   a memory and at least one processor to perform operations including:
   performing control, in response to the detector detecting that the object has approached, to turn off a display of a first display unit,
   wherein, in a case where interval shooting or long exposure shooting is performed and in response to the detector detecting that the object has approached, performing control includes performing control to turn on the display of the first display unit, and
   wherein, in response to capturing an image in the interval shooting when the display of the first display unit is in an on state, performing control includes performing control to turn off the display of the first display unit.

2. The display control apparatus according to claim 1, wherein, in a case where a predetermined shooting mode other than the interval shooting mode and the long exposure shooting mode is performed and in response to the detector detecting that the object has approached, performing control includes performing control to turn off the display of the first display unit and to turn on a display of a second display unit, and
   wherein, in the case where interval shooting or long exposure shooting is performed, performing control includes performing control to turn off the display of the second display unit and to turn on the display of the first display unit.

3. The display control apparatus according to claim 1, wherein the detector is configured to detect an eye approaching to a viewfinder,
   wherein the first display unit is a display unit arranged outside the viewfinder, and
   wherein the second display unit is a display unit arranged inside the viewfinder.

4. The display control apparatus according to claim 1, wherein, from when start of the interval shooting is instructed to be performed to when end of performing the interval shooting is instructed, performing control includes performing control to turn on the display of the first display unit in response to the detector detecting that the object has approached.

5. The display control apparatus according to claim 1, wherein, in the case where the interval shooting or the long exposure shooting is performed, performing control includes performing control to increase sensitivity of the detector to detect that the object has approached.

6. The display control apparatus according to claim 1, wherein, after the interval shooting is started, performing control includes performing control to turn off the display of the first display unit into an off state, and thereafter, in response to the detector detecting that the object has approached, performing control includes performing control to turn on the display of the first display unit into the on state.

7. The display control apparatus according to claim 4, wherein, in response to the detector detecting, in a middle of the interval shooting, that the object has approached, performing control includes performing control to display on the first display unit information on the interval shooting.

8. The display control apparatus according to claim 4, wherein in response to the detector detecting, in a middle of the interval shooting, that the object has approached, performing control includes performing control to display on the first display unit the image captured in the interval shooting.

9. The display control apparatus according to claim 8, wherein in response to the detector detecting, in the middle of the interval shooting, that the object has approached, performing control includes performing control to display on the first display unit an image synthesized from a plurality of images captured in the interval shooting.

10. The display control apparatus according to claim 1, wherein in response to the detector detecting, in a middle of the interval shooting, that the object has approached, performing control includes performing control to enable a touch operation on the first display unit.

11. The display control apparatus according to claim 1, wherein in response to the detector detecting, in a middle of the interval shooting, that the object has approached, performing control includes performing control to enable remotely accepting setting of the interval shooting.

12. The display control apparatus according to claim 1, wherein, when an image is being captured in the interval shooting, performing control includes performing control to disable detecting by the detector of the object coming into proximity.

13. The display control apparatus according to claim 1, wherein in a case where the interval shooting is performed and before the display of the first display unit is turned off, performing control includes performing control to display a guide on the first display unit to indicate that, in response to the detector detecting the object approaching, the display of the first display unit is turned on.

14. The display control apparatus according to claim 1, wherein the detector is configured to detect a face approaching.

15. The display control apparatus according to claim 1, wherein the detector is arranged on the same surface as a surface on which the first display unit is arranged.

16. The display control apparatus according to claim 1, further comprising image sensor.

17. A method of controlling a display control apparatus having a detector configured to detect that an object has approached, the method comprising:
performing control in response to the detector detecting that the object has approached, to turn off a display of a first display unit,
wherein, in a case where interval shooting or long exposure shooting is performed and in response to the detector detecting that the object has approached, performing control includes performing control to turn on the display of the first display unit, and
wherein, in response to capturing an image in the interval shooting when the display of the first display unit is in an on state, performing control includes performing control to turn off the display of the first display unit.

18. A non-transitory computer-readable storage medium storing a program configured to cause a computer to perform a method of controlling a display control apparatus having a detector configured to detect that an object has approached, the method comprising:
performing control, in response to the detector detecting that the object has approached, to turn off a display of a first display unit,
wherein, in a case where interval shooting or long exposure shooting is performed and in response to the detector detecting that the object has approached, performing control includes performing control to turn on the display of the first display unit, and
wherein, in response to capturing an image in the interval shooting when the display of the first display unit is in an on state, performing control includes performing control to turn off the display of the first display unit.

19. A display control apparatus comprising:
a detector configured to detect that an object has approached; and
a memory and at least one processor to perform operations including:
performing control, in response to the detector detecting that the object has approached, to turn off a display of a first display unit,
wherein, in a case where interval shooting or long exposure shooting is performed and in response to the detector detecting that the object has approached, performing control includes performing control to turn on the display of the first display unit, and
wherein, in a case where the interval shooting or the long exposure shooting is performed, performing control includes performing control to increase sensitivity of the detector to detect that the object has approached.

20. A display control apparatus comprising:
a detector configured to detect that an object has approached; and
a memory and at least one processor to perform operations including:
performing control, in response to the detector detecting that the object has approached, to turn off a display of a first display unit,
wherein, in a case where interval shooting or long exposure shooting is performed and in response to the detector detecting that the object has approached, performing control includes performing control to turn on the display of the first display unit, and
wherein, in a case where the interval shooting is performed and before the display of the first display unit is turned off, performing control includes performing control to display a guide on the first display unit to indicate that, in response to the detector detecting the object approaching, the display of the first display unit is turned on.

* * * * *